United States Patent [19]

Shannon

[11] Patent Number: 4,754,924
[45] Date of Patent: Jul. 5, 1988

[54] VARIABLE GEOMETRY NOZZLE

[76] Inventor: Aubrey J. Shannon, 407 94th S.E., Bellevue, Wash. 98004

[21] Appl. No.: 33,620

[22] Filed: Apr. 3, 1987

[51] Int. Cl.$^4$ .................... B64D 33/04; B63H 25/46; F02K 1/00
[52] U.S. Cl. ..................... 239/127.3; 239/265.13; 239/265.17; 181/215; 181/220
[58] Field of Search .......... 239/127.3, 265.13, 265.17, 239/265.33; 181/215, 220; 60/230

[56] References Cited

U.S. PATENT DOCUMENTS

| | | | |
|---|---|---|---|
| 2,974,744 | 3/1961 | Wade | 181/220 X |
| 3,032,981 | 5/1962 | Lawler | 239/265.13 |
| 3,592,291 | 7/1971 | Medawar | 181/220 |
| 3,910,375 | 10/1975 | Hache et al. | 181/215 |
| 3,982,696 | 9/1976 | Gordon | 239/265.17 |

FOREIGN PATENT DOCUMENTS 627598  9/1961  Canada ............ 239/265.33

*Primary Examiner*—Andres Kashnikow
*Assistant Examiner*—Patrick N. Burkhart
*Attorney, Agent, or Firm*—Robert W. Jenny

[57] ABSTRACT

A jet engine nozzle operable in a cruise setting and a noise attenuation setting. In the cruise setting the nozzle provides simple through flow. In the noise attenuation setting some ambient flow is ducted into the through flow and some through flow is ducted into ambient flow. The nozzle comprises a fixed portion and a movable portion, rotatable a part of a revolution about the fixed portion. The nozzle comprises two rotary valves which operate in unison, a sleeve type valve and a face type. The sleeve type comprises cooperating lobed openings in the fixed portion and in a forward segment of the movable portion, the movable portion fitting telescopically over the fixed portion. The rotary type comprises the exit faces of aft facing lobes in the fixed portion and cooperating entrance faces of lobes in the aft segment of the movable portion. In the attenuation setting both valves are open. The sleeve valve ducts ambient flow into the flow through the nozzles and the face valve allows flow into ambient air from the flow through the nozzle. In the cruise setting both valves are closed. Opening and closing are powered by an appropriate state-of-the-art actuation apparatus and system and involve rotating the movable portion a part of a revolution so that either the various openings register with each other to make the valves open or register with structure which obstructs the opening and closes the valves, providing simple through flow. The nozzle may also be effectively used in modifying the infra-red signature of an engine.

7 Claims, 3 Drawing Sheets

VARIABLE GEOMETRY NOZZLE

BACKGROUND OF THE INVENTION

1. Field:

The subject invention is in the field of methods and apparatus for attenuating the noise produced by jet engines. More specifically it is in the field of apparatus which is adjustable and provides two modes of operation, non-attenuated, when the noise produced causes no problems and attenuated. It is generally known in the art that attenuation reduces the overall propulsion efficiency and that the better solutions to the problems of attenuation of jet engine noise provide the better compromises between noise attenuation and the efficiency given up to achieve the attenuation. Still more specifically, the invention is in the field of apparatus for intermixing the ambient air in which an engine is operated and effluent gases.

2. Prior Art:

The problem of attenuating the noise of jet engines is a long standing one and it has become more pressing and difficult as a result of increasingly stringent legal limitations on the noise produced by airplanes. The limitations are such that owners of airplanes equipped with pure jets face the choice of re-engining the airplanes, if feasible, retiring the airplanes or finding ways of attenuating the noise without unacceptable reduction in operating efficiency.

U.S. Pat. No. 4,422,524 covers a nozzle for a jet which provides a cruise mode configuration and a sound-suppression mode. The apparatus of this patent involves a relatively large number of individual moving parts, all of which must move relative to fixed surfaces with seals between all the moving and fixed parts. It will be recognized by those skilled in the art that the number of moving parts and the sealing requirements present design, manufacturing, operational and maintenance problems which will work against the overall utility of the patented solution to the described problem. These problems are the result in large part of the severe operating conditions in the vicinity of the jet exhausts. The patent provides no data related to the effectiveness of the patented apparatus in regard to sound suppression or attenuation or to thrust losses associated with the attenuation obtained.

Another solution is shown in U.S. Pat. No. 3,550,721. The basic approach for noise suppression is to introduce ambient air into the exit flow and increase the exit area to accommodate the increased flow. This approach is well known in the art. The embodiment in this instance involves a multiplicity of complex parts pivoted to fixed structure along with longitudinally movable elements for uncovering inflow areas for the ambient air and for increasing the nozzle exit area. In this instance also it will be understood that the number and complexity of moving parts in the jet exhaust environment will present problems working against the utility of the invention. In this instance also there is no data presented related to the effectiveness of the invention in terms of suppression achieved relative to thrust lost in achieving it.

U.S. Pat. No. 3,592,291 shows a method and apparatus for suppressing jet noise and thrust augmentation is cited. There is no provision for geometric changes to suit the conditions which vary between cruise and sound suppression operations. The method involves mixing ambient flow into the jet gases. There are no moving parts. However, it is now well known in the art that sound suppression with thrust augmentation has not yet been achieved and that some form of variable nozzle geometry is needed to achieve useful compromises between noise suppression and thrust lost in obtaining it.

There is profuse prior art also for sound suppression of turbofan (fan jet) engines. With fan jet engines the methods involve mixing primary flow, fan flow and/or ambient air flow and in each case variable geometry embodiments are required. Examples of this art are found in U.S. Pat. Nos. 3,568,794, 3,579,993, 4,077,206 and 4,117,671. In the embodiments in these patents flows are mixed and ambient flow is inducted but in no case is primary flow vented outboard through the nozzle wall into the ambient flow.

It has been determined that there are advantages to be gained with fan jet engines by varying the bypass ratio. The bypass ratio, briefly, is the ratio of the mass of the fan flow to the mass of the primary flow. Ratios in the range of 2/1 to 5/1 are common. A mechanism for varying the bypass ratio is disclosed in U.S. Pat. No. 3,779,282 by Klees. This mechanism is relevant prior art to the apparatus of the subject invention and will be referred to in the Detailed Description of the Invention.

It can be understood from the above discussion that there is a longstanding need for apparatus which enables achieving an improved compromise between the suppression of the noise of a jet engine and the costs required to achieve the suppression, the costs including performance degradation and manufacturing and maintenance costs. In particular there is a need for such apparatus which can readily be applied to existing engines, as different from apparatus which must be designed and built into the engine.

It is a prime objective of the subject invention to provide such apparatus. Inherent further objectives are that the apparatus have few moving parts and be simple to manufacture, operate and maintain.

SUMMARY OF THE INVENTION

The subject invention is a nozzle assembly which replaces the conventional nozzle of a jet engine. The assembly comprises a fixed portion and a movable portion which fits in part telescopically over the fixed portion, does not contact it and can be rotated with respect to it. Both portions incorporate a plurality of lobes, lobes being essentially scoops aligned with the direction of gas flow through the assembly. Some lobes face upstream, others downstream.

The fixed portion, attached to the engine, has eight lobes in the embodiment described in this application. These lobes face downstream, are equally spaced around the portion, and protrude into the gas flow. The movable portion has two rows of lobes with eight lobes in each row. All the lobes in both portions are approximately the same length. The fixed portion is one lobe length long. The lobes in the movable portion are sequential and the movable portion length is two lobe lengths. The first, upstream lobes in the movable portion face upstream and protrude outward into ambient flow around the nozzle. The second row of lobes also faces upstream but protrudes into the gas flow through the nozzle. The circumferential distance between the lobes at their widest dimensions is equal to the space between lobes. Therefore each lobe and each space between lobes can occupy up to $360/16 = 22\frac{1}{2}$ degrees of the circumference of the nozzle. The second row of lobes in the movable portion is oriented so that their open, upstream ends align longitudinally with the spaces between the lobes in the first row.

The movable portion telescopes over the fixed portion. In the first operating position the first row of lobes on the movable portion aligns with the lobes on the fixed portion to form eight inlets which scoop ambient air into the gas stream. The second row of lobes in the movable portion is then positioned to provide outlets for some of the gas flow. In the second operating position, with the movable portion rotated 22½ from the first position, the spaces between the first row of lobes on the movable portion cover over the openings of the lobes on the outer circumferential surface of the fixed portion and the downstream ends of the lobes in the fixed portion mate with the upstream ends of the second row of lobes in the movable portion, closing off the exits provided for the gas flow by the second row of lobes.

The first operating position is for sound attenuation which is produced by (1) the introduction of ambient air into the jet flow by the interaction of the lobes in the fixed portion and the first row of lobes in the movable portion and by (2) the exit of gas through the second row of lobes in the movable portion.

The second operation position is for cruise, with no sound attenuation and a simple through flow operating condition. The nozzle and nozzle elements are sized so that nozzle flow matches engine operation satisfactorily in all phases of adjustment of the nozzle.

As is well known in the art, the mixing of ambient air with the gas flow and the mixing of the flow from the second row of lobes in the movable portion with ambient air will attenuate the noise. Further, it will be understood that the simple flow through configuration of the nozzle for cruise will produce minimal thrust penalties.

In the cruise mode the forward ends of the first row of lobes on the movable part would be exposed to ambient air and cause aerodynamic drag. To minimize this drag, lobes are mounted on the engine to streamline these first row lobes in the cruise mode.

The fixed portion is attached to the structure of the engine with method and techniques as used for conventional nozzles. The aft end of the fixed portion is provided with a reinforcement ring which has an external peripheral groove. In the structure of the movable portion between the two rows of lobes there is a plurality of tongues provided which extend into the groove in the fixed portion, thereby attaching the movable portion to the fixed portion and permitting rotation of the movable portion with respect to the fixed portion about their coincident longitudinal axes. Rotational positioning of the movable portion in respect to the fixed portion is set by actuation apparatus which is within the capabilities of persons or ordinary skill in the art. The apparatus is controlled to move the movable portion interchangeably between the cruise and attenuation settings.

It can be understood from this summary that the invention meets it objectives. There is ample mixing to provide sound suppression and the thrust loss during cruise is minimal. There is only one moving part. No seals or close tolerance fits are required so that manufacturing operation and maintenance costs can be reasonable and the apparatus is simple to manufacture, operate and maintain.

The invention is described in more detail below, in conjunction with the attached drawings.

DETAILED DESCRIPTION OF THE INVENTION

Figure 1:
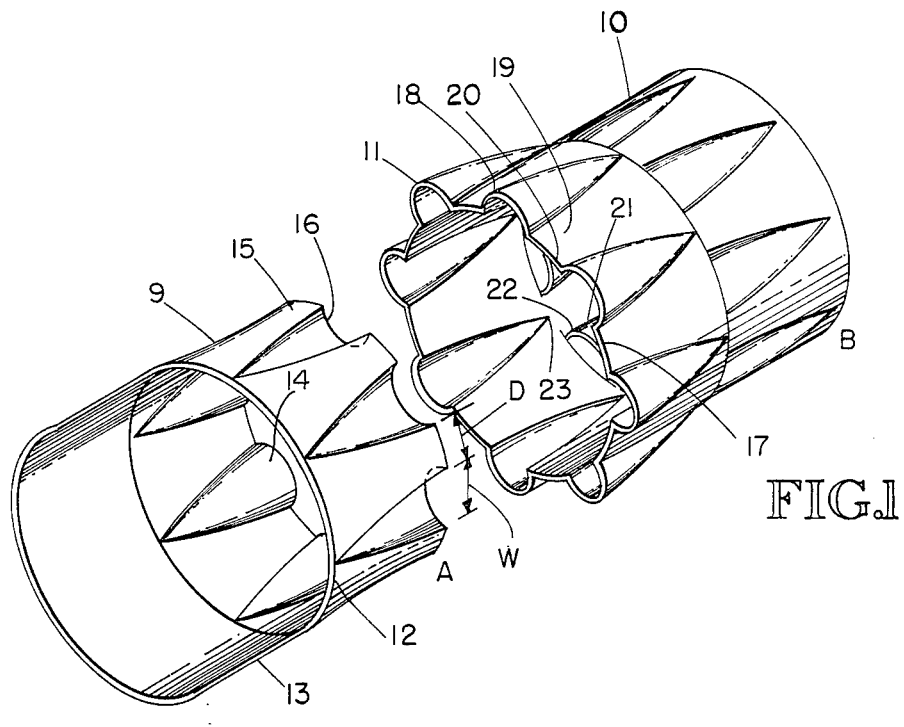
FIG. 1 is an exploded perspective view of the fixed and movable portions of the nozzle.

Referring to FIG. 1, the subject invention comprises two basic parts, a fixed portion 9 and a movable portion 10. Both are basically cylindrical in shape with lobes, or which lobe 11 is typical, located and oriented as described below. Portion 9 has a circular forward end 12 which is structurally attached to a mating part 13 of the engine on which the nozzle is installed. It has eight lobes, of which lobe 14 is typical, equally spaced around its periphery 15. In each instance of its use the term lobe denotes an opening in the peripheral wall of a portion of the nozzle with a scoop shaped apparatus provided in conjunction with the opening. The distances, of which D is typical, between the wide ends of the lobes, are equal to the widths of the wide ends of the lobes, of which W is typical. Each lobe is symmetrical about its longitudinal centerline and the centerlines are aligned in the direction of gas flow through the nozzle, i.e. they lie in planes perpendicular to the plane of end 12. As shown in the drawing, the lobes in the fixed portion protrude into the passage enclosed by the portions and face aft, i.e. their large ends are aft of the essentially pointed ends. The aft facing ends are coplanar with the plane of end 16 of the fixed portion and that plane is perpendicular to the cylindrical surfaces.

Movable portion 10 has two sets of lobes. The front set, comprising eight lobes, including lobe 11, is equidistantly spaced around periphery 17 and protrude outwardly from the periphery. These lobes face forward, i.e. their large, open ends 18 face into the direction the engine moves through the air. The widths of the wide ends of the lobes are equal to widths of the spaces between them, space 19 being typical. They are symmetrical about their centerlines which lie in planes perpendicular to the plane of end 20. Peripheries 15 and 17 are cylindrical and the inside diameter of 17 is enough larger than the outside diameter of 15 to permit 17 to telescope over 15 without the two parts touching. A diameter difference of ¼ inch, providing ⅛ clearance is suitable.

The second set of eight lobes in the movable portion, of which lobe 21 is typical, also face forward and are symmetrical about their centerlines which lie in planes perpendicular to end 20. They protrude into the gas flow through the nozzle. In the embodiment shown their forward ends, of which end 22 is typical, lie in a plane and the aft ends of the first set of lobes in the movable portion, of which end 23 is typical, lie somewhat forward of that plane. This plane is termed the plane of adjoinment of the forward segment with the aft segment of the movable portion. The nozzle is designed so that gas pressure at this plane is ambient. The forward segment is cylindrical, the aft frustoconical and shaped to provide constant pressure flow in that segment of the nozzle.

The second set of lobes is longitudinally aligned so that the open ends of the second set are in alignment with the spaces between the lobes of the first set. Again, the widths of the lobes of the second set equals the widths of the spaces between them.

Figure 2:
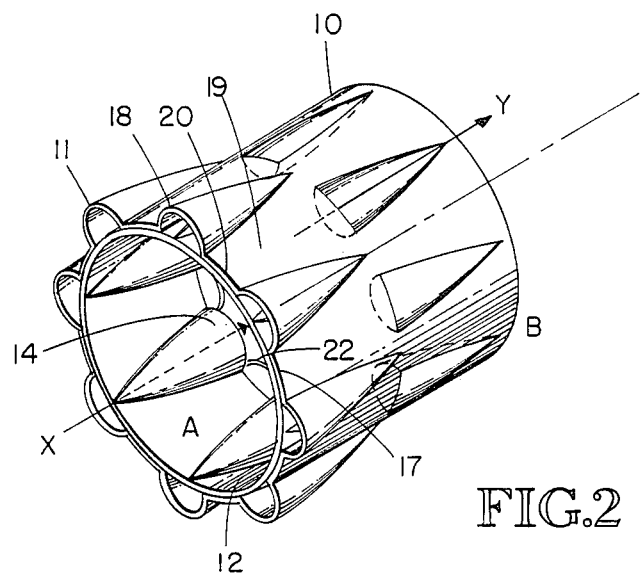
FIG. 2 is a perspective view showing the movable portion assembled over the fixed portion and set in the sound attenuation mode.

Referring to FIG. 2, showing the movable portion telescopically engaged with the fixed portion and set for the sound attenuation mode, note that the lobes of the fixed portion are in radial alignment with the first set of lobes of the movable portion and are misaligned with the second set. In this setting ambient air is scooped into the first set of lobes and passes through them and the lobes of the fixed portion into the gas flow of the engine. This flow is indicated by arrow X. Also, some of the flow is directed out of the nozzle into ambient air by the second set of lobes in the movable portion. This flow is depicted by arrow Y.

Figure 3:
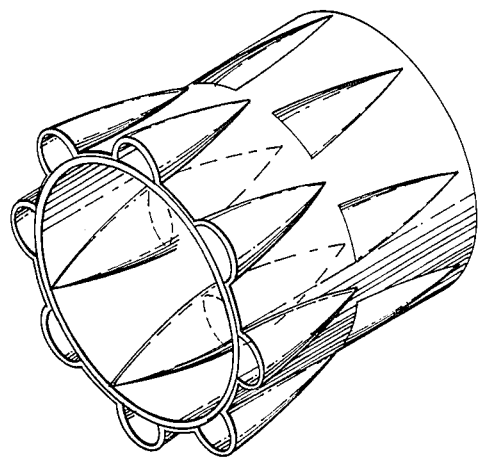
FIG. 3 is the same as FIG. 2 but with the nozzle set for the cruise mode.

In FIG. 3 this apparatus is shown set for operation in the cruise mode. The movable portion has been rotated to put the lobes of the second set on the movable portion in alignment with the lobes of the fixed portion. Accordingly, the segments of periphery 17 between lobes cover the openings of the lobes of the fixed portion in periphery 15. In this setting no ambient air can enter the nozzle and no flow can exit the nozzle except at the end. In other words, it is a simple flow-through nozzle.

Figure 4:
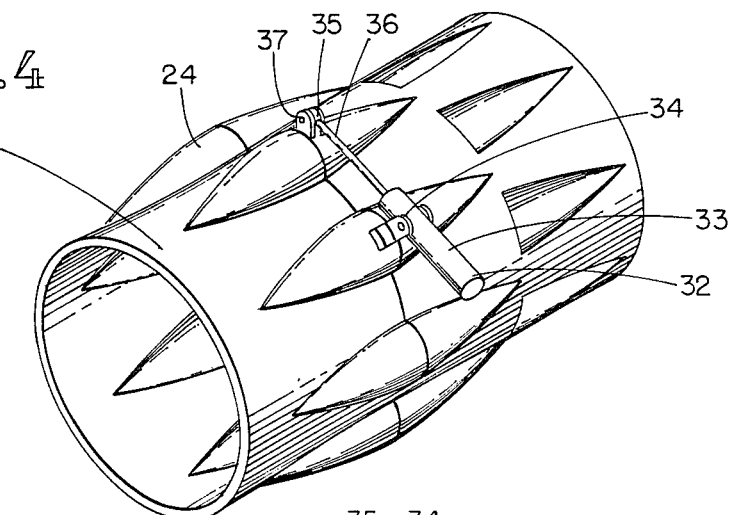
FIG. 4 is a perspective view of the subject nozzle installed on an engine and in the cruise mode.

FIG. 4 shows the nozzle adjusted and set for cruise operation. The lobes of the first openings on the movable section now are aligned with a fourth set of lobes, of which lobe 24 is typical, attached to the engine to streamline the protuberances of the first set of lobes on the movable portion. Since there are, in this embodiment, eight lobes per set and eight segments between lobes per set, with the segments and lobes of equal width, there is a total of sixteen elements, with the result that the movable portion is rotated 360/16=22½ to change from the setting for one mode of the setting for the other.

Figure 5:
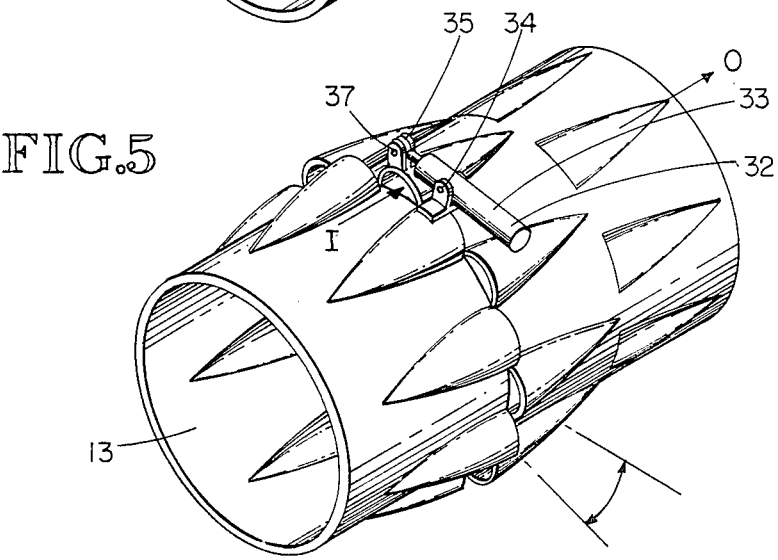
FIG. 5 is a perspective view of the nozzle installed on an engine and set in the noise attenuation mode.

FIG. 5 is a perspective view of the subject nozzle attached to the end of a jet engine and set in the noise attenuation mode. Arrow I indicates ambient air flow into the nozzle through the first set of lobes on the movable portion and the lobes of the fixed portion. Arrow O indicates outflow from the gas flow in the nozzle to ambient.

It can be seen from the description of the invention thus far that the nozzle comprises two rotary valves. One is a sleeve type comprising the fixed portion of the subject nozzle and the forward segment of the movable portion. The other is a face type comprising the exit faces of the lobes of the fixed portion and the entrance faces of the second row of lobes in the movable portion. The valves operate in unison and there are two settings or states: first, the noise attenuation setting or state and second, the cruise setting or state. In the first setting, or state, the openings and lobes of the fixed portion and the forward segment of the movable portion cooperate to provide passages for ambient air into the flow passage of the nozzle and the openings and lobes of the aft segment of the movable portion provide passages for fluid flow from the passage into ambient air.

In the second setting, in which both valves are in their closed states the movable portion has been rotated 22½ relative to the fixed portion, the openings of the forward section of the movable portion are covered by the spaces between the openings of the fixed portion and vice versa. Further, the exit faces of the lobes of the forward segment of the movable portion register with the entrance faces of the lobes in the aft segment of the movable portion. Therefore there are no openings or passages through the wall of the passage, i.e. in the cruise setting the nozzle provides simple through flow.

Figure 6:
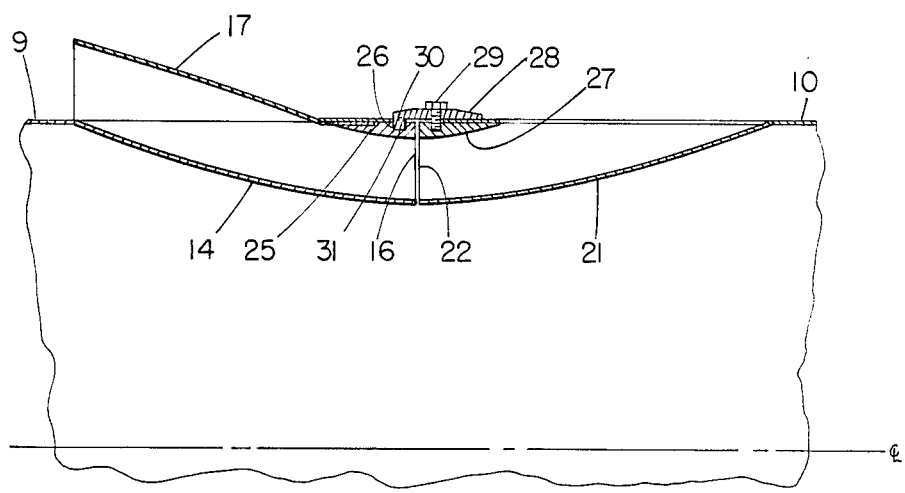
FIG. 6 is an enlarged sectional view of the apparatus provided for the attachment of the movable portion to the fixed portion with the fixed portion attached to the engine in place of a conventional nozzle.

FIG. 6 is a sectional view, enlarged, of the apparatus which attaches the movable portion 10 to the fixed portion 9. The nozzle is in the cruise setting with lobe 14 in the fixed portion aligned with lobe 21 in the aft section of the movable portion. Reinforcement ring 25 is at the end of the fixed portion and is attached to it by welding or brazing or the like. Groove 26 extends around its outer periphery. Reinforcement ring 27 is attached by welding, brazing or the like to the inner surface of the rotary portion.

Figure 8:
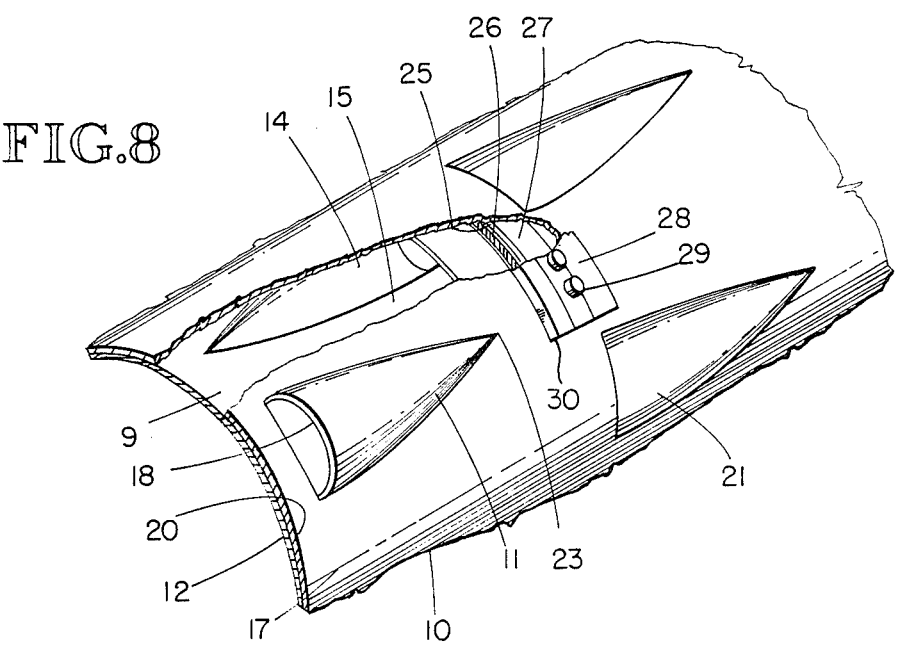
FIG. 8 shows a detailed sectional view of the structural and spatial relationships between lobes and reinforcement rings.

A plurality of fixtures, of which 28 is typical, are attached to ring 27 and the wall of the movable portion by fastener(s) 29, threaded into ring 27. The fixtures have tongues 30 which extend through slot(s) into groove 26. There may be several fixtures, distributed around the periphery or there may be two essentially semicircular fixtures. The tongues contact the bottom 31 of the groove and serve to keep the walls of the fixed and movable portions separated. The fixtures are resilient enough in the radial direction to accommodate any relative dimensional diametric changes which may occur because of the effects of temperature changes of the interconnected apparatus. As shown in FIG. 8, a detailed sectional view of the structural, spatial relationships between lobes and reinforcement rings, the rings reinforce the arched ends of the lobes and serve to help maintain the circular crosssectional shape of the lobed section of the nozzle. The numbers in FIG. 8 refer to the same parts as in other FIGS.

In connection with the development of variable geometry nozzles for jet engines it has been necessary to develop materials and lubricants which withstand the operating environment of such nozzles and such materials and lubricants are used in this instance.

Rotation of the movable portion with respect to the fixed portion is provided by actuator 32, FIGS. 4 and 5. The actuator is a hydraulic actuator with its cylinder 33 pivoted to fixed structure at 34 and the end 35 of its piston rod 36 pivoted to the movable portion at 37. The actuator is powered and controlled by means well known in the art. In the embodiment as shown, contraction of the actuator will put the nozzle in the cruise setting and extension in the attenuation setting.

The significance of the Klees U.S. Pat. No. 3,779,282 as prior art to the subject invention can now be discussed in suitable perspective in view of the above description. Whereas the subject nozzle comprises two rotary valves, of two types, the Klees valve is a single, face type rotary valve. Furthermore, whereas the subject nozzle is designed to transfer a part of one flow (ambient flow) into another (the passage flow) in one valve and vice versa in the other, with the part flows being a small fraction of the total flow in each case, the Klees valve handles the total flow at all times, so that when the transfer of flow from a first annular channel to a second is a small fraction of the total, the transfer, from second to first channel, is the difference between the small fraction and 1, i.e. a large fraction of the total flow.

It can be understood from this description that the subject invention meets its objectives. It provides an improved compromise between the amount of noise suppression achieved and the performance lost in achieving the noise suppression. The invention can be interchanged directly with nozzles used on the jet engines on which it is intended to be used. The apparatus has basically one moving part and its parts are similar to parts already proven to be simple to manufacture, operate and maintain.

Figure 7:
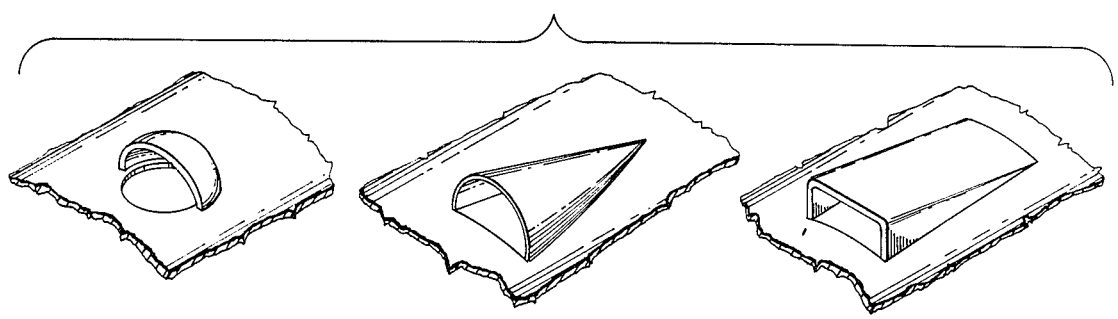
FIG. 7 illustrates a variety of opening and lobe shapes.

It will be understood by those skilled in the art that other embodiments and modifications of the one described are possible within the scope of the invention which is limited only by the appended claims. For example, in the embodiment shown in the drawings all the openings are in the shape of the isosceles triangles and the lobes are semiconical to match. Other shapes of openings can be used, such as circular with hemi-cup shaped lobes, and trapezoidal and rectangular with appropriately configured lobes. With rectangular openings, the lobes are generally rectangular in crossection with have radiused outer corners. The width of the rectangular crossection is constant. The height ranges from maximum at the entrance and exit faces to zero at the end of the lobe opposite the exit or entrance face. Various openings and lobes are shown in perspective in FIG. 7.

Furthermore, the invention may comprise four or six lobes in each set of lobes instead of eight. Also, the lobes need not occupy the full circumferences of the nozzle as they do in the described embodiment. For example, alternate sets of lobes could be eliminated, providing a nozzle with four lobes in each set, evenly spaced around the circumference, and still adjustable from one mode to the other by rotating the movable portion 22½. Still further, the amount of rotation could be altered by altering the widths of the openings and lobes.

Furthermore, it will be understood by those skilled in the art that, while the invention has been described as applied to noise attenuation, it can be readily applied to modifying the emanation of infra-red heat from the nozzle to alter, primarily diminish, what is termed the infra-red signature of an engine equipped with the subject nozzle.

What is claimed is:

1. A nozzle for a jet engine operating in ambient air, said nozzle having a flow through passage for effluent gases and comprising:
    a first rotary valve of the sleeve type, having an open state and a closed state,
    a second rotary valve of the face type, having an open state and a closed state,
    a fixed portion and
    a movable portion,
    said movable portion being assembled with and movable relative to said fixed portion to a first setting and second setting,
    means for moving said movable portion to said first setting and to said second setting,
    said first and second valves being in said open states when said movable portion is in said first setting and in said closed states when said movable portion is in said second state,
    said first rotary valve providing at least one first passage from said ambient air to said flow through passage when said first valve is in said open state and said second rotary valve providing at
    least one passage from said flow through passage to said ambient air when said second valve is in said open state,
    said at least one first and second passages being closed off when said first and second valves are in said closed states,
    whereby, when said nozzle is in said first setting said first and second valves are in said open states and air flows through said at least one first passage into said flow through passage and gasses flow through said at least one second passage into said ambient air.

2. The nozzle of claim 1 in which said passages comprise openings having lobes and said openings are rectangular.

3. A variable geometry nozzle operable in ambient air and having a flow-through passage and being settable in a cruise setting and an attenuation setting and being operable in a cruise mode and an attenuation mode, said nozzle comprising:
    a first, sleeve type rotary valve,
    a second, face type rotary valve,
    means for setting said nozzle in said cruise setting and said supression setting,
    said first valve providing passages from said ambient air into said flow-through passage,
    said second valve providing passages from said flow-through channel to said ambient air,
    said first and second valves being open in said attenuation setting and closed in said cruise setting,
    whereby in said attenuation setting said passages provided by said first valve allow flow from said ambient air into said flow-through passage and said passages provided by said second valve allow flow from said flow-through passage to said ambient air and in said cruise setting all said passages are closed off.

4. A variable geometry nozzle for a jet engine having an attenuation setting and a cruise setting and being operable in a sound attenuation mode and a cruise mode and having an outflow end, said nozzle comprising first and second rotary valves,
    said nozzle having a gas flow passage and comprising a fixed portion and a movable portion surrounding said passage, said fixed and movable portion being essentially cylindrical,
    said fixed portion being attached to said outflow end and having a first cylindrical wall having an outside diameter, a first forward end, first aft end, an aft planar face, a first length and a first plurality of first openings in said first wall, said first openings being spaced radially equidistant from each other and having first spaces between them,
    said first spaces having first widths and said first openings having second widths, said first and second widths being essentially equal,
    said first openings being provided with lobes extending from said first wall into said passage and having exit faces coplanar with said aft face,
    said movable portion having a second length, a forward segment and an aft segment, said forward segment having a cylindrical wall having an inside diameter, a second forward end having a planar face, a third length equal to said first length, said aft segment having a wall which is a surface of revolution, said forward and aft sections joining in a plane of adjoinment which is perpendicular to said second cylindrical wall, said inside diameter being greater than said outside diameter by an amount in the range of 0.1 to 1% of said outside diameter, said second plurality of openings being in said forward segment and spaced radially equidistant from each other and having second spaces between them, said second openings having third widths and said second spaces having fourth widths, said third and fourth widths being essentially equal, said third plurality of openings being in said aft segment and spaced radially equidistant from each other and having third spaces between them, said third openings having fifth widths and said third spaces having sixth widths, said fifth and sixth widths being essentially equal, said second openings being provided with lobes extending outwardly from said second cylindrical wall and having entrance faces coplanar with said forward face, said third openings being provided with lobes extending into said passage and having entrance faces coplanar with said plane of adjoinment, said third openings being in longitudinal alignment with said second spaces in said forward segment, said second portion being rotatably attached to said fixed portion with said forward segment telescopically surrounding said fixed portion, whereby said first openings and said second openings are positioned relative to each other to function as said first rotary valve and said exit faces of said lobes provided on said first openings and said entrance faces of said lobes provided on said third openings are positioned relatively to cooperate in said plane of adjoinment to function as said second rotary valve, means being provided to rotate said movable portion relative to said fixed portion interchangeably between said suppression setting and said cruise setting, whereby with said movable portion set in said attenuation setting: said first and second openings are coincident and they, in conjunction with said lobes provided for said openings, provide passages for said ambient air to flow from outside said nozzle into said passage and said lobes provided on said second openings and said second openings provide passages for gas flow from said passage through said second wall into said ambient air and with said rotary valves being open said nozzle is operable in said sound attenuation mode, and with said movable portion set in said cruise setting: said second openings are aligned with said first spaces and said exit faces of said lobes provided on said first openings are aligned in said plane of adjoinment with said entrance faces of said lobes provided on said third openings, so that both rotary valves are closed and said nozzle is in said cruise mode.

5. The nozzle of claim 3 in which said openings have isosceles triangles shapes.

6. The nozzle of claim 3 in which said openings have trapezoidal shapes.

7. The nozzle of claim 3 in which said openings have rectangular shapes.

* * * * *